United States Patent Office 2,948,588
Patented Aug. 9, 1960

---

2,948,588

METHOD OF MANUFACTURING ALKALI METAL TRIPOLYPHOSPHATES

Arthur N. Baumann, Lakeland, Fla., assignor to International Minerals & Chemical Corporation, a corporation of New York No Drawing. Filed Sept. 13, 1955, Ser. No. 534,177

5 Claims. (Cl. 23—106)

This invention relates to the manufacture of detergents. More particularly, it relates to the manufacture of tripolyphosphates. Still more particularly, it relates to the manufacture of homogeneous crystalline salts of mixed sodium and potassium tripolyphosphate.

The use of tripolyphosphates as detergents is well known. Sodium and potassium tripolyphosphates, however, both have disadvantages. Sodium tripolyphosphate salts have a relatively low solubility of about 20 grams/liter. Potassium tripolyphosphate salts have a higher solubility in water, i.e., about 150 grams/liter, but in general are very hygroscopic. Alkali metal tripolyphosphates of industry have been the so-called "glasses," hygroscopic in nature and therefore less desirable than some of the other phosphates despite their excellent calcium sequestering action.

The primary object of this invention is to overcome the shortcomings and disadvantages of the products heretofore in use.

It is another object of this invention to provide a crystalline nonhygroscopic tripolyphosphate.

It is still another object of this invention to provide a less expensive method of manufacture of mixed alkali metal tripolyphosphate salts having a sequestering action equivalent to that of tripolyphosphates currently sold commercially.

These and other objects of the invention will be apparent to those skilled in the art from the following description.

Now it has been discovered that an aqueous solution of alkali metal orthophosphate can be reacted with a different alkali metal salt to give mixed alkali metal salt products, the quantity of reactants being such that the mol ratios in the final product are of the order of 3–3.2:K:2–1.8Na:3P and the final product obtained as a nonhygroscopic crystalline mass by heat treatment at a temperature in the range between about 500° F. and about 1200° F. This product shows in X-ray diffraction studies that it is a homogeneous crystalline salt having an X-ray diffraction pattern different from that of a simple mixture of sodium tripolyphosphate and potassium tripolyphosphate of an equivalent sodium to potassium ratio.

The basic reactant in this process is the orthophosphate salt. This salt may be any alkali metal salt, for example, sodium, potassium, or lithium orthophosphate. Balancing the quantities of reactants is simplest if monopotassium orthophosphate is the starting material. However, the phosphorus content of the aqueous solution can be brought to the proper level for manufacture with phosphoric acid when monosodium orthophosphate is the starting material.

When starting with either potassium or sodium orthophosphate, the reaction in aqueous solution must be carried out with a salt of an alkali metal different from the alkali metal of the orthophosphate in order to obtain a mixed alkali metal product. When utilizing monopotassium orthophosphate, for example, suitable reaction materials are sodium carbonate, sodium hydroxide, sodium basic organic salts and the like.

After reaction in aqueous medium, the solution is concentrated to between about 70% and about 80% solids concentration and the resultant paste heat treated at temperatures below fusion of the solids. The solution seldom can be allowed to reach a temperature in excess of 1250° F. and preferably is maintained in the range between about 950° F. and about 1050° F.

In the preferred embodiment of the invention utilizing the least expensive of raw materials, impure aqueous solution of phosphoric acid is reacted with potassium chloride in a mol ratio of about 1 mol $P_2O_5$:2 mols of KCl. The reaction mixture is fired at a temperature in the range of between about 1400° F. and about 2000° F., preferably about 1600° F., to convert the reaction mixture to the potassium metaphosphate form and to drive off HCl and other impurities, or if other reactants are used such as potassium sulfate to eliminate the sulfate as volatile oxides of sulfur.

The metaphosphate material after heat treatment for a period of about one-half hour to one hour is water quenched and the quenched material hydrolyzed in an autoclave at pressures of the order of 100–200 lbs. per sq. in. and temperatures of the order of 329° F. to 437° F., for a period of between about thirty and about ten minutes. By this pressure hydrolysis, the metaphosphate is converted to the orthophosphate in quantities of the order of 96%–99%. Upon conversion of the potassium salt to the orthophosphate state, the iron and aluminum impurities present in the system are precipitated and can be removed from the orthophosphate solution by suitable means such as centrifuging, filtration, or equivalent operations.

To the aqueous solution of monopotassium orthophosphate is added a salt such as sodium carbonate in a mol ratio of approximately 1 mol of sodium carbonate for 3 mols of monopotassium orthophosphate. The aqueous solution is then evaporated in a suitable apparatus such as a steam heated evaporator finishing in a direct fired pan, or equivalent apparatus and the solution reduced to a paste having a solids content of approximately 75% solids. This paste having its components present in proportions equivalent to that shown in the formula $K_3Na_2P_3O_{10}$ is heat treated in a suitable furnace such as a rotary kiln, at a temperature of approximately 1000° F. for a period of between 45 minutes and about 60 minutes.

The aqueous solution might also be spray dried and heat treated at 1000° F. for 45 to 60 minutes or be sprayed directly into a rotary furnace and heat treated.

The invention will be further understood from the following example which is given by way of illustration and without any intention that the invention be limited thereto.

*Example*

Phosphate rock was digested with aqueous sulfuric acid solution to produce a phosphoric acid solution having the following analysis:

| | Wt. Percent |
|---|---|
| $P_2O_5$ | 55.2 |
| CaO | 0.364 |
| $Fe_2O_3$ | 2.20 |
| $Al_2O_3$ | 1.68 |
| $SO_4$ | 3.37 |

To 100 gallons of this solution was added 85 pounds of sylvite (59% $K_2O$) and the reaction product heated to 1600° F. in a rotary furnace.

Molten material removed from the rotary furnace was quenched in water. Approximately 300 parts by weight of solution of potassium metaphosphate was autoclaved for 15 minutes at a temperature of 190° C. and at a pressure of approximately 150 lbs. per sq. in. By pressure hydrolysis approximately 98% of the metaphosphate was converted to orthophosphate.

A precipitate of potassium, iron and aluminum phosphates was formed. The precipitate was removed by filtration.

Approximately 13,350 parts by weight of solids-free monopotassium orthophosphate solution of a salt concentration of 15% was mixed with 495 parts by weight of sodium carbonate. The solution was evaporated to a thick paste of approximately 75% solids content.

3,000 parts by weight of paste were heated batchwise in a rotary furnace to approximately 1000° F. for 45 minutes and air cooled.

The cool product was studied by X-ray and showed a diffraction pattern indicating crystalline structure.

The product was treated in accordance with the procedure described in Analytical Chemistry 18 (7), pages 411–415, July 1946, to prove its sequestering action.

Four grams of solids were dissolved in distilled water and the solution diluted to 250 ml. The dilute solution was filtered to remove insoluble material. Twenty-five ml. of the filtered solution was diluted to 45 ml. and the pH adjusted to 10 with sodium hydroxide. The pH adjusted solution was transferred to the photoelectric colorimeter and titrated with calcium chloride solution containing ¼ gram of calcium per 100 ml. of solution to the cloud point.

The product prepared in the example had a calcium value of 9.88 compared to Victor Chemical Corporation's sodium tripolyphosphate value of 9.63 and a commercial metaphosphate "glass" value of 10. Its $P_3O_{10}$ content was determined to be 53.1% by the zinc sulfate method described in Analytical Chemistry, volume 19, page 97, R. N. Bell.

Having thus described my invention, what I claim is:

1. The method of preparing a homogeneous crystalline, substantially non-hygroscopic, mixed alkali metal tripolyphosphate containing potassium, sodium and phosphorus in the following mole ratio: 3 to 3.2K:2 to 1.8Na:3P, which consists essentially of reacting an aqueous solution of an alkali metal orthophosphate selected from the group consisting of the sodium and potassium orthophosphates with a compound of an alkali metal different from the alkali metal of said orthophosphate and selected from the group consisting of the sodium carbonate, sodium hydroxide, potassium carbonate and potassium hydroxide, said orthophosphate and said compound being utilized in proportions requisite to produce in the final product said mole ratio, concentrating to a solids content of at least about 70% and heating the resulting concentrated reaction mixture, without substantial fusion, at a temperature in the range between about 500° F. to about 1250° F. to produce said homogeneous crystalline mixed alkali metal tripolyphosphate.

2. The method of claim 1 wherein the aqueous reaction mixture of said orthophosphate and said compound is concentrated to a solids content of about 70% to about 80% by weight and is thereafter heated to a temperature to within the range of about 500° F. to about 1250° F.

3. The method of claim 1 wherein said alkali metal orthophosphate is prepared by reacting an alkali metal chloride selected from the group consisting of potassium chloride and sodium chloride with impure aqueous phosphoric acid containing iron and aluminum in solution, concentrating the resulting solution, heat treating the concentrated solution at a temperature in the range between about 1400 and about 2000° F., hydrolyzing the heat treated material to the orthophosphate state, removing the precipitated iron and aluminum phosphates, and recovering an aqueous solution of an orthophosphate salt of said alkali metal.

4. The method of claim 1 wherein said alkali metal orthophosphate is potassium orthophosphate.

5. The method of claim 4 wherein said compound is sodium carbonate.

References Cited in the file of this patent
UNITED STATES PATENTS

| | | |
|---|---|---|
| 2,064,979 | Kaselitz | Dec. 22, 1936 |
| 2,174,614 | Bornemann et al. | Oct. 3, 1939 |
| 2,288,418 | Partridge | June 30, 1942 |
| 2,419,148 | King | Apr. 15, 1947 |
| 2,493,809 | Garrison | Jan. 10, 1950 |
| 2,767,045 | McCullough | Oct. 16, 1956 |
| 2,776,187 | Pfrengle | Jan. 1, 1957 |